(12) United States Patent
Yamamoto

(10) Patent No.: US 7,324,138 B2
(45) Date of Patent: Jan. 29, 2008

(54) FALSE-COLOR REDUCING DEVICE

(75) Inventor: Yasuhiro Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 711 days.

(21) Appl. No.: 10/764,453

(22) Filed: Jan. 27, 2004

(65) Prior Publication Data

US 2004/0183919 A1 Sep. 23, 2004

(30) Foreign Application Priority Data

Jan. 27, 2003 (JP) ............................ P2003-017782

(51) Int. Cl.
*H04N 5/228* (2006.01)
*G06K 9/32* (2006.01)
(52) U.S. Cl. .................... 348/222.1; 382/300
(58) Field of Classification Search ............ 348/222.1, 348/272, 273, 223.1; 345/589; 382/300
See application file for complete search history.

(56) References Cited

U.S. PATENT DOCUMENTS

| | | | |
|---|---|---|---|
| 6,570,616 B1 * | 5/2003 | Chen ........................... | 348/272 |
| 6,636,629 B1 * | 10/2003 | Sasai ........................... | 382/167 |
| 6,825,876 B1 * | 11/2004 | Easwar et al. .............. | 348/234 |
| 2002/0093510 A1 | 7/2002 | Abe | |
| 2002/0093579 A1 | 7/2002 | Abe | |
| 2002/0101434 A1 | 8/2002 | Abe | |
| 2002/0101525 A1 | 8/2002 | Abe | |
| 2003/0052981 A1 * | 3/2003 | Kakarala et al. ............. | 348/272 |
| 2003/0067548 A1 * | 4/2003 | Sugimori ..................... | 348/273 |
| 2003/0086606 A1 * | 5/2003 | Hunter et al. ................ | 382/167 |
| 2003/0112863 A1 * | 6/2003 | Demos .................. | 375/240.01 |

FOREIGN PATENT DOCUMENTS

JP 2002-218482 8/2002

* cited by examiner

*Primary Examiner*—David Ometz
*Assistant Examiner*—Tuan Le
(74) *Attorney, Agent, or Firm*—Greenblum & Bernstein, P.L.C.

(57) ABSTRACT

A false-color reducing device comprises a first interpolation processor, a color difference data calculation processor, a second interpolation processor, and a third interpolation processor. The first correlation value calculating processor obtains R plane data in which all the pixels have R data, G plane data in which all the pixels have G data, and B plane data in which all the pixels have B data. The color difference data calculation processor calculates U data and V data (or color difference data) regarding first (R), second (G), and third (B) pixels. The second interpolation processor calculates a mean value of the V data of four pixels adjacent to the first pixel in oblique directions, and sets this mean value as replaced V data for the first pixel. The third interpolation processor calculates a mean value of the U data of four pixels adjacent to the third pixel in oblique directions, and sets this mean value as replacement U data for the third pixel.

6 Claims, 9 Drawing Sheets

FIG. 4

| RAW DATA | | A1 | A2 | | | | |
|---|---|---|---|---|---|---|---|
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 40 | 50 | 50 | 50 | 50 | 50 |
| 50 | 50 | 50 | 40 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |

FIG. 5

|    |    |    | W1 |    |    |    |    |
|----|----|----|----|----|----|----|----|
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |

FIG. 6

|    |    | W2 |    |    |    |    |
|----|----|----|----|----|----|----|
| 50 | 50 | 50 | 50 | 50 | 50 | 50 |
| 50 | 50 | 50 | 50 | 50 | 50 | 50 |
| 50 | 50 | 50 | 50 | 50 | 50 | 50 |
| 50 | 48 | 45 | 48 | 50 | 50 | 50 |
| 50 | 45 | 40 | 45 | 50 | 50 | 50 |
| 50 | 48 | 45 | 48 | 50 | 50 | 50 |
| 50 | 50 | 50 | 50 | 50 | 50 | 50 |

| 50 | 50 | 50 | 50 | 50 | 50 | 50 |
|----|----|----|----|----|----|----|
| 50 | 48 | 45 | 48 | 50 | 50 | 50 |
| 50 | 45 | 40 | 45 | 50 | 50 | 50 |
| 50 | 48 | 45 | 48 | 50 | 50 | 50 |
| 50 | 50 | 50 | 50 | 50 | 50 | 50 |
| 50 | 50 | 50 | 50 | 50 | 50 | 50 |
| 50 | 50 | 50 | 50 | 50 | 50 | 50 |

FIG. 8

|  |  | W7 | W4 |  |  |
|---|---|---|---|---|---|
| 0 | 0 | 0 | 0 | 0 | 0 |
| 0.2 | 0.41 | 0.16 | 0 | 0 | 0 |
| 0.4 | −0.2 | −2.1 | −1 | 0 | 0 |
| 0.2 | −2.1 | −4.8 | −2.5 | 0 | 0 |
| 0 | −1 | −2.5 | −1 | 0 | 0 |
| 0 | 0 | 0 | 0 | 0 | 0 |

FIG. 9

|  |  |  | W5 |  |  |
|---|---|---|---|---|---|
| 0 | 0 | 0 | 0 | 0 | 0 |
| −1 | −2.5 | −1 | 0 | 0 | 0 |
| −2.5 | −4.7 | −1.7 | 0.34 | 0 | 0 |
| −1 | −1.7 | 0.69 | 0.84 | 0 | 0 |
| 0 | 0.34 | 0.84 | 0.34 | 0 | 0 |
| 0 | 0 | 0 | 0 | 0 | 0 |

FIG. 10

|  |  |  | W6 | | | | |
|---|---|---|---|---|---|---|---|
| V00 | V01 | V02 | V03 | V04 | V05 | V06 | V07 |
| V10 | V11 | V12 | V13 | V14 | V15 | V16 | V17 |
| V20 | V21 | V22 | V23 | V24 | V25 | V26 | V27 |
| V30 | V31 | V32 | V33 | V34 | V35 | V36 | V37 |
| V40 | V41 | V42 | V43 | V44 | V45 | V46 | V47 |
| V50 | V51 | V52 | V53 | V54 | V55 | V56 | V57 |
| V60 | V61 | V62 | V63 | V64 | V65 | V66 | V67 |
| V70 | V71 | V72 | V73 | V74 | V75 | V76 | V77 |

FIG. 11
```
           W8
-0.2  -0.4 ⌒ -0.4  -0.1
 -1  | -1.3  -1.2 | -0.4
-1.3 | -1.5  -1.4 | -0.6
-1.2   -1.4  -1.2   -0.4
```
FIG. 12
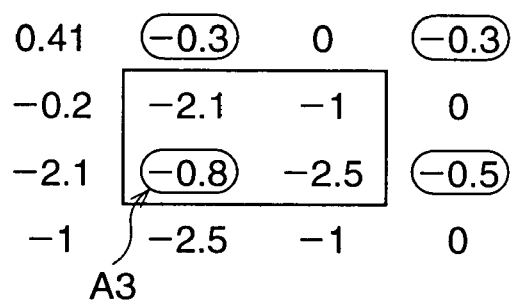
FIG. 13
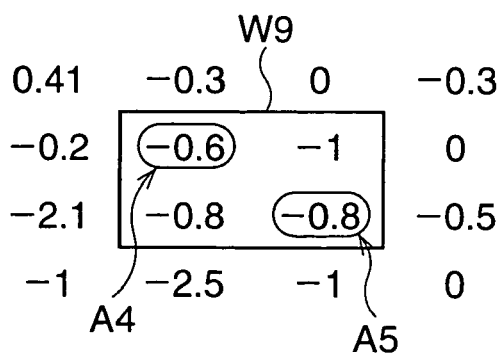

FALSE-COLOR REDUCING DEVICE

BACKGROUND OF THE INVENTION

1. Field of the Invention

The present invention relates to a device which is mounted in a digital camera, for example, to obtain U data and V data which are color difference data, based on red (R) data, green (G) data, and blue (B) data obtained through an imaging device, and more particularly to a device for reducing a false-color generated in an image that is reproduced based on the color difference data.

2. Description of the Related Art

Conventionally, there is known a digital camera, in which R, G, and B color filters are arranged on a light receiving surface of the imaging device, according to the Bayer system (Bayer-color-filter). Namely, raw data of a still image are read out from the imaging device, in which R, G, and B pixels are arranged in a checkerboard arrangement according to the Bayer system, and in an imaging process, an interpolation is performed regarding each of the pixels, so that three plane data of R, G, and B are generated, as disclosed in Japanese Patent. Publication No. 2002-218482.

However, when a subject image has a potion in which different color dots are scattered in a uniform color area, such as a rough wall surface, or when raw data contains noise, a pixel data having a color component quite different from the original color component may be obtained by an interpolation. This causes a false-color, so that the image quality is lowered. Thus, it is known to perform an interpolation to U data and V data generated from the R, G, and B plane data in order to reduce the generation of the false-color.

In the prior art, however, the interpolation, carried out for reducing the false-color, needs a lot of calculations, and therefore, the process time is long.

SUMMARY OF THE INVENTION

Therefore, an object of the present invention is to reduce the number of interpolation calculations, which are carried out in order to reduce the false-color, so that the process time is shortened.

According to the present invention, there is provided a false-color reducing device comprising a raw data reading processor, a first interpolation processor, a color difference data calculation processor, a second interpolation processor, and a third interpolation processor.

The raw data reading processor reads a raw data, in which a first row and a second row are arranged alternately in a vertical direction. The first row is formed by arranging a first pixel representing red (R) data and a second-pixel representing green (G) data alternately in a horizontal direction. The second row is formed by arranging the second pixel and a third pixel representing blue (B) data alternately in the horizontal direction. The first interpolation processor performs an interpolation on the raw data to generate R plane data in which all the pixels have the R data, G plane data in which all the pixels have the G data, and B plane data in which all the pixels have the B data. The color difference data calculation processor calculates U data and V data, which are color difference data, regarding the first, second, and third pixels, using the R plane data, the G plane data, and the B plane data. The second interpolation processor calculates a mean value of the V data of four pixels adjacent to the first pixel in oblique directions, and sets this mean value as replacement V data for the first pixel. The third interpolation processor calculates a mean value of the U data of four pixels adjacent to the third pixel in oblique directions, and sets this mean value as replacement U data for the third pixel.

BRIEF DESCRIPTION OF THE DRAWINGS

The objects and advantages of the present invention will be better understood from the following description, with reference to the accompanying drawings in which:

FIG. 4 is a view showing an example of raw data;

FIG. 5 is a view showing G plane data obtained by a G-interpolation;

FIG. 6 is a view showing R plane data obtained by an R-interpolation;

FIG. 7 is a view showing B plane data obtained by a B-interpolation;

FIG. 8 is a view showing V data;

FIG. 9 is a view showing U data;

FIG. 10 is a view showing a definition of coordinates of pixels of the V data;

FIG. 11 is a view showing a result of an interpolation in a comparison example;

FIG. 12 is a view showing an interpolation regarding a first pixel in the embodiment; and FIG. 13 is a view showing an interpolation regarding a third pixel in the embodiment.

DESCRIPTION OF THE PREFERRED EMBODIMENTS

Figure 1:
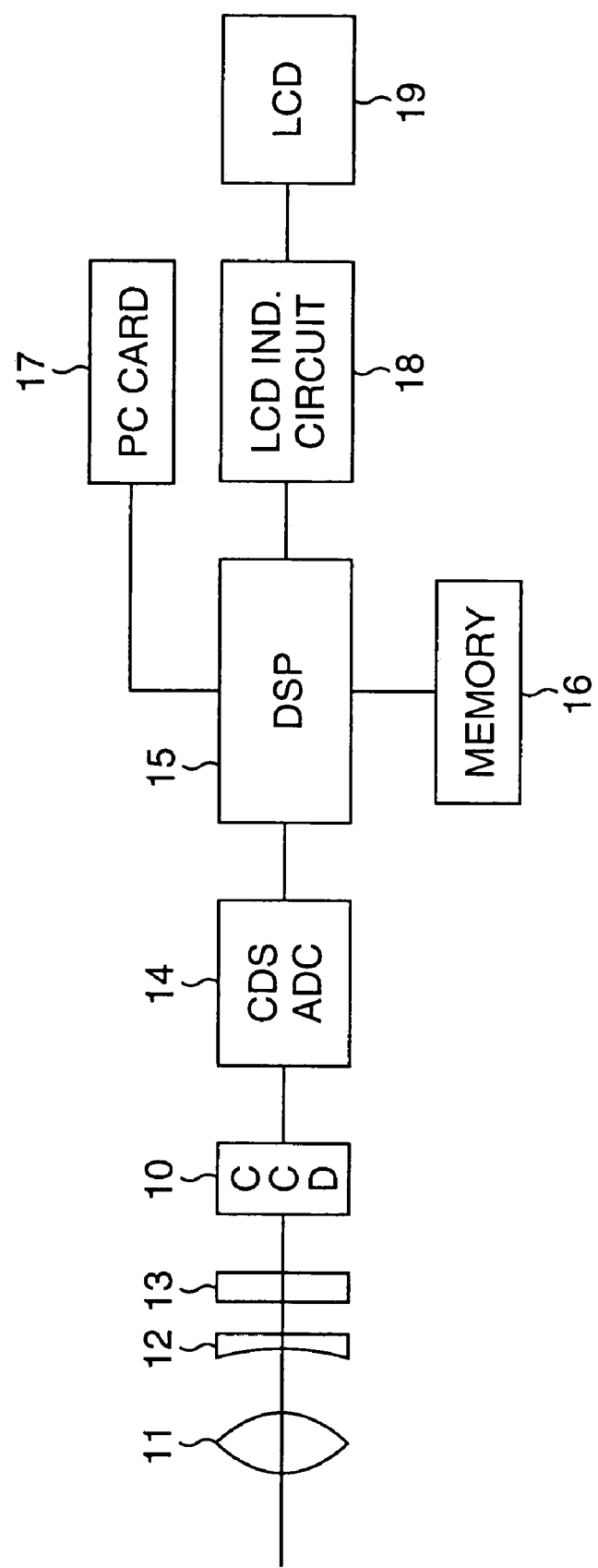
FIG. 1 is a block diagram showing an electrical and optical construction of a digital camera provided with a false-color reducing device of an embodiment of the present invention.

The present invention will be described below with reference to the embodiments shown in the drawings.

FIG. 1 is a block diagram generally showing an electrical and optical construction of a digital camera provided with a false-color reducing device of an embodiment of the present invention. The digital camera is provided with a single imaging device (i.e., CCD) 10. Red (R), green (G), and blue (B) color filters, regularly arranged in a matrix, according to the Bayer system, for example, are provided on a light receiving surface of the imaging device 10. An infrared cut-off filter 12, an optical-low-pass filter 13, and the imaging device 10 are disposed on the optical axis of a photographing lens 11, in this order. Accordingly, an infrared component and a noise component are removed from a light beam passing through the photographing lens 11, and the light beam is made incident on the imaging device 10, so that an analogue electric signal or image signal is generated in the imaging device 10.

The image signal is processed in an analogue signal processing circuit 14 provided with a correlated double sampling circuit (CDS) and an A/D converter (ADC), so that a noise component is removed from the image signal and the image signal is converted into a digital image signal, which is subjected to various image processes, described later, in a digital signal processing circuit 15.

The image signal processed in the digital signal processing circuit 15 is stored in a memory 16. The image data is then read out from the memory 16, is subjected to a compression process, and is recorded in a PC card 17 as a still image. The image data of the still image is subjected to a predetermined process in a LCD indication circuit 18, so that the still image is indicated by a liquid crystal display (LCD) 19 as a color image. Further, the image data output from the digital signal processing circuit 15 is directly input to the LCD indication circuit 18, so that a monitor image is indicated by the LCD 19 as a moving image.

Figure 2:
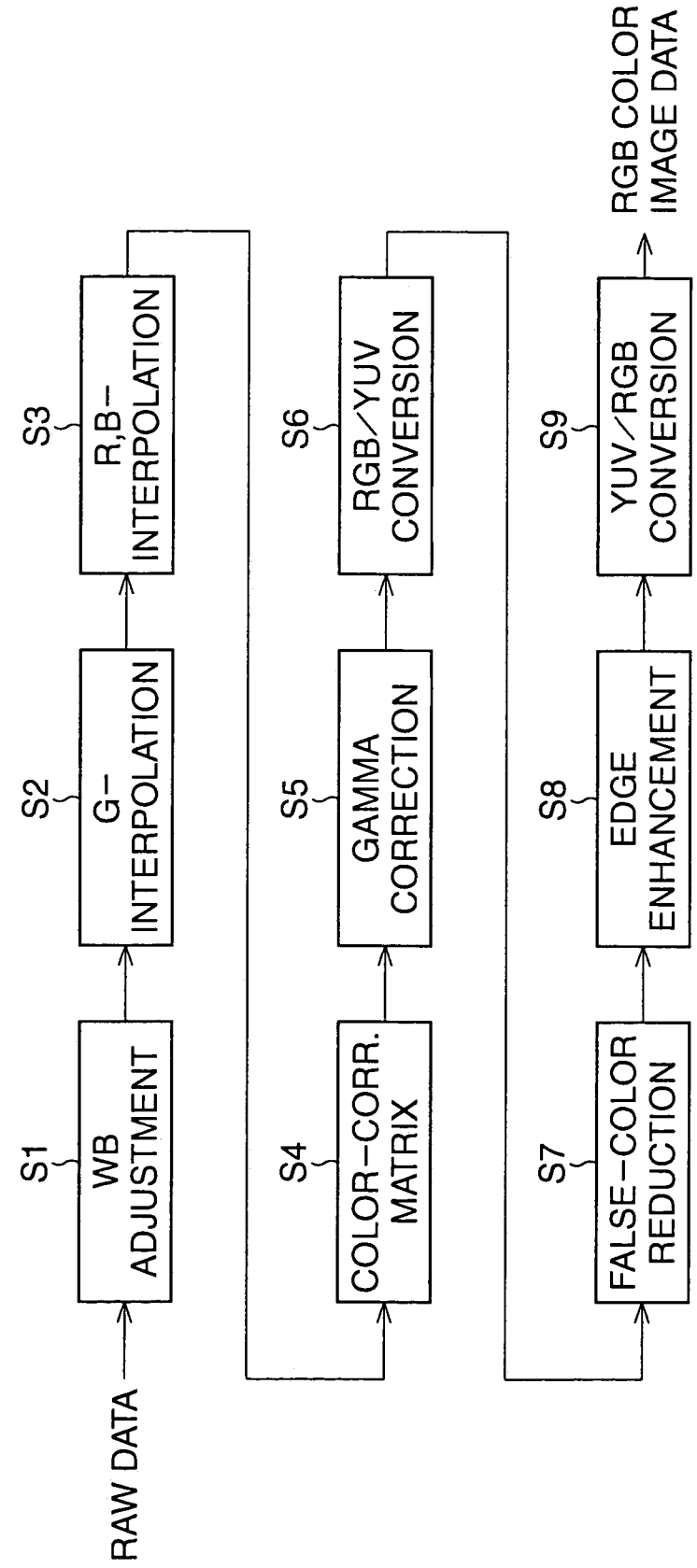
FIG. 2 is a view showing the order in which image processes are performed in a digital signal processing circuit.

FIG. 2 is a view showing the order in which image processes are performed in the digital signal processing circuit 15. The image data (or raw data) input to the digital signal processing circuit 15 is subjected to a white balance adjustment in Step S1. In Step S2, a G-interpolation is executed, so that G-pixel data is obtained regarding R-pixels and B-pixels by the interpolation. In Step S3, an R-interpolation and a B-interpolation are executed, so that R-pixel data and B-pixel data are obtained, regarding pixels which are neither R-pixels nor B-pixels, by the interpolation. Thus, regarding all of the pixels, R-, G-, and B-pixel data are obtained.

In Step S4, a color correction matrix operation is performed for the pixel data obtained as a result of Step S3, so that an error, generated due to the characteristics of the color filter, is removed. In Step S5, a gamma correction is performed on the pixel data subjected to the color correction matrix operation. In Step S6, an RGB/YUV conversion is performed. Namely, the R-, G-, and B-pixel data are converted to a luminance data (Y) and color difference data or U data (=B−Y) and V data (=R−Y), according to a known method.

In Step S7, a false-color reduction process is performed on the U data and the V data, as described later. In Step S8, an edge enhancement is performed on the luminance data. In Step S9, a YUV-RGB conversion is performed, so that the luminance data and the color difference data are converted into an R-, G-, and B-pixel data. RGB color image data obtained by performing these processes are output to the LCD 19, or are subjected to a compression process and recorded in a PC card, as described above.

Figure 3:
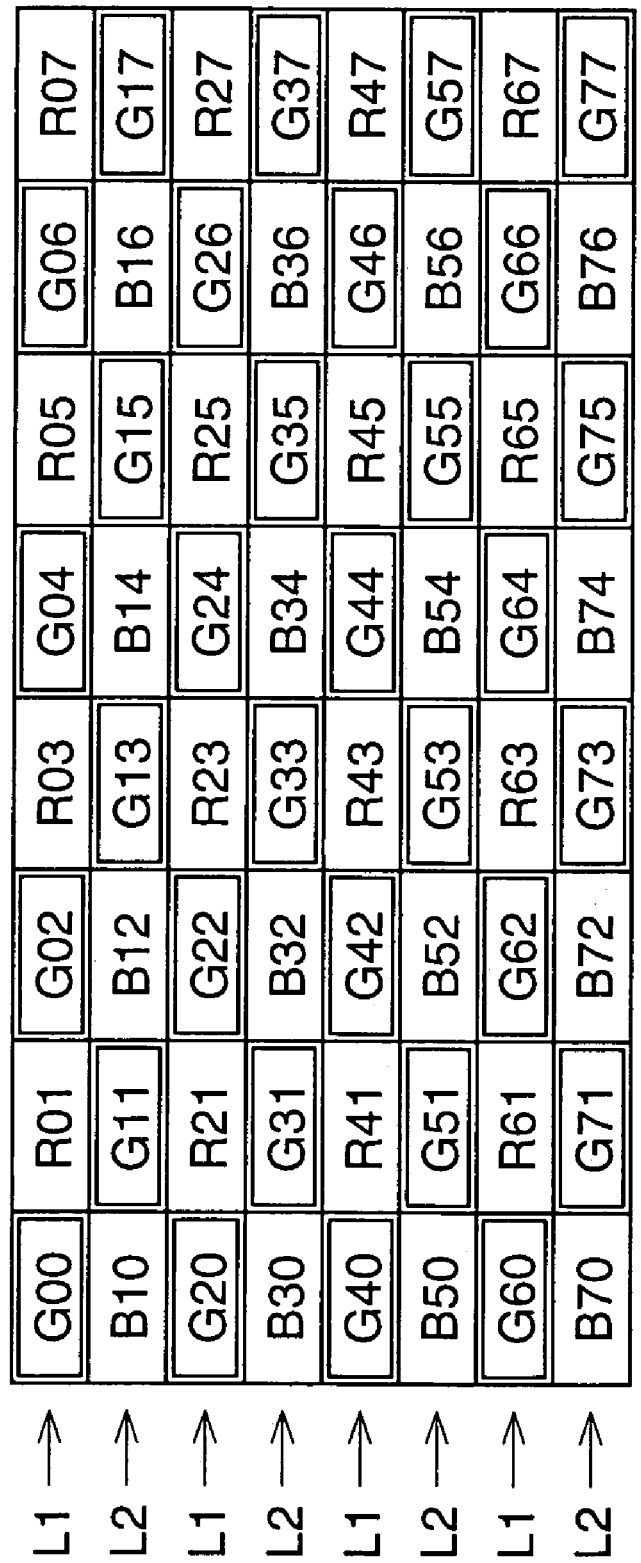
FIG. 3 is a view showing the arrangement and colors contained in image-data obtained by an imaging device.

FIG. 3 shows the arrangement and colors of pixels contained in the image data (or raw data) obtained by the imaging device 10. The characters "R", "G", and "B" mean red, green, and blue. Accordingly, in the image data, a first row L1, formed by arranging a first pixel representing red (R) data and a second pixel representing green (G) data alternately in a horizontal direction, is positioned at odd numbered rows from the top, and a second row L2, formed by arranging the second pixel and a third pixel representing blue (B) data alternately in the horizontal direction, is positioned at even numbered rows from the top. Namely, the first row L1 and the second row L2 are arranged alternately in a vertical direction. The numerals indicate coordinates, and the origin of the coordinates is the left corner (i.e., G00). For example, in the third row from the top, G20, R21, G22, R23, . . . stand in a row from left to right. Note that, in FIG. 3, a G-pixel is indicated with a double frame.

Thus, the first, second, and third pixels respectively correspond to the R, G, and B color filters of the Bayer-color-filter.

FIG. 4 shows an example of raw data, in which B-pixel data "40" and R-pixel data "40" (references A1 and A2) are noise contained in the image data in which R-, G-, and B-pixel data are uniformly distributed. In the embodiment, as described below, even when noise is contained in the raw data, false-color, generated in the reproduced image obtained by the image processes shown in FIG. 2, is reduced by using a smaller number of calculations in comparison with a conventional device. Note that, in FIG. 4, the arrangement of the pixels is the same as that of FIG. 3, and the second pixels are indicated with double frames.

FIG. 5 shows a result of the G-interpolation executed in Step S2 of FIG. 2, i.e., G plane data in which all the pixels have the G data. The frame W1 indicates an area which has four corners at G11, B16, R61, and G66 in FIG. 3. The G plane data is obtained by interpolating G data of the second pixels that are adjacent to each other, regarding the first and third pixels. G data of the first and third pixels are obtained by making arithmetic mean of G data of four second pixels that are adjacent to each other. For example, G12 is as follows:

$$G12=(G11+G13+G02+G22)/4$$

FIG. 6 shows a result of the R-interpolation executed in Step S3 of FIG. 2, i.e., R plane data in which all the pixels have the R data. The frame W2 indicates the same area as the frame W1. In the generation of the R plane data, regarding the second pixel, the upper and lower sides of which the first pixels are adjacent to, R data of the first pixels of the upper and lower sides are interpolated. Further, regarding the second pixel, the right and left sides of which the first pixels are adjacent to, R data of the first pixels of the right and left sides are interpolated. For example, R11 and R22 are obtained by the following formula.

$$R11=(R01+R21)/2$$

$$R22=(R21+R23)/2$$

Regarding the third pixel, R data of four first pixels that are adjacent to each other in oblique directions are interpolated. For example, R12 is obtained by using the following formula.

$$R12=(R01+R03+R21+R23)/4$$

FIG. 7 shows a result of the B-interpolation executed in Step S3 of FIG. 2, i.e., B plane data in which all the pixels have the B data. The frame W3 indicates the same area as the frame W1 of FIG. 5. In the generation of the B plane data, similarly to the generation of R plane data, regarding the second pixel, the upper and lower sides of which the third pixels are adjacent to, B data of the third pixels of the upper and lower sides are interpolated. Further, regarding the second pixel, the right and left sides of which the third pixels are adjacent to, B data of the third pixels of the right and left sides are interpolated. Regarding the first pixel, B data of four third pixels that are adjacent to each other in oblique directions are-interpolated.

FIGS. 8 and 9 show V data and U data. The V data and the U data are calculated for all of the first, second, and third pixels, according to the following formula, using the R plane data, the G plane data, and the B plane data.

$$U=-0.169R-0.331G+0.5B$$

$$V=0.5R-0.4187G-0.0813B$$

Note that the frames W4 and W5 shown in FIGS. 8 and 9 correspond to the frames W1, W2, and W3 of FIGS. 5, 6, and 7.

Since the raw data (FIG. 4) contains noise, the R plane data and the B plane data are not uniform as shown in FIGS. 6 and 7, and some data other than "50" are contained. On the other hand, the U data and the V data would have to be composed of only "0" if the raw data were all "50". In reality, however, the U data and the V data contain some data other than "0" as shown in FIGS. 8 and 9 because the raw data contain noises. Therefore, if a color image is reproduced using the U data and the V data as they are, a false color may be generated. Accordingly, as described below, an interpolation or a false-color reduction process is performed.

FIG. 10 shows coordinates of pixels of the V data. The definition of the coordinates is the same as that of FIG. 3, and the origin is the left corner (i.e., "V00"). Here, taking the V data enclosed by the frame W6 shown in FIG. 10, i.e., V33, V34, V43, and V44, as an example, the result of the interpolation is described below. Note that the frame W6 corresponds to the frame W7 shown by the broken line in FIG. 8.

When the embodiment is not utilized, i.e., in an interpolation in a comparison example, an arithmetic mean of V data of eight pixels enclosing an objective pixel, which is to be interpolated, is calculated. For example, V33 is obtained according to the following formula (1).

$$V33=(V22+V23+V24+V34+V44+V43+V42+V32)/8 \quad (1)$$

FIG. 11 shows the result of the interpolation. Namely, the V data within the frame W7 of FIG. 8 are replaced with the V data within the frame W8 of FIG. 11, due to the interpolation.

As understood from formula (1), in the interpolations regarding the four pixels within the frame W8, it is necessary to carry out divisions (i.e., shift calculations) four times after additions of (8×4) times. Conversely, in the embodiment, the interpolation is performed by using a smaller number of calculations, as described below.

Regarding the first pixel in which the raw data is the R-pixel, a mean value of the V data of four pixels adjacent to the first pixel in oblique directions is determined as a replacement V data for the first pixel. For example, V43 is interpolated according to the following formula (2).

$$V43=(V32+V34+V52+V54)/4 \quad (2)$$

In the example shown in FIG. 8, as shown by reference. A3 in FIG. 12, V43=−0.8. Note that, in FIG. 12, numerals enclosed by circles are the first pixels, and are results in which a mean value of the V data of four pixels adjacent in oblique directions is set as the replacement V data for the first pixel. A mean value of each of the four pixels adjacent in the oblique directions is obtained using R data of four first pixels adjacent to each of the four pixels in the oblique directions, as described with reference to FIG. 6. Therefore, according to the interpolation of formula (2), a sufficient filtering effect is obtained regardless of the smaller number calculations.

On the other hand, regarding the second pixel for which the raw data is the G-pixel, a mean value of the V data of the four pixels adjacent to the upper, lower, right, and left sides of the second pixel is determined as replacement V data for the second pixel. For example, V33 is interpolated according to the following formula (3).

$$V33=(V23'+V43'+V32+V34)/4 \quad (3)$$

Note that V23' and V43' in formula (3) are V data obtained by the interpolation according to formula (2), and V32 and V34 are V data obtained directly from the raw data. In the case of FIG. 12, V23'=−0.3, V43'=−0.8, V32=−0.2, V34=−1, and therefore, V33=−0.6 as shown by reference A4 in FIG. 13. Note that, in the interpolation according to formula (3), since terms (V23' and V43') obtained by formula (2) are contained, a sufficient filtering effect is obtained similarly to the interpolation according to formula (2).

V44 is obtained from four pixels adjacent to the upper, lower, right, and left sides of the pixel of V44, in a similar way as formula. (3), and V44=−0.8 as shown by reference A5 in FIG. 13. Thus, the V data within the frame W9 are obtained by the interpolation. Regarding the third pixel in which the raw data is the B-pixel., an interpolation is not performed, V34 (=−1) is maintained as it is. Note that, in FIG. 13, numerals enclosed by circles relate to the second pixel, and are results in which a mean value of the V data of four pixels adjacent to the upper, lower, right, and left sides is set as the replaced V data of the second pixel.

In the embodiment, as understood from formula (2) or (3), the interpolation regarding the four pixels within the frame W9 is performed only by the four divisions (i.e., shift calculations) after 16 (=4×4) additions, and thus, the number of calculations is half the comparison example.

A calculation of the offset amount from the actual value (=0) regarding the V data within the frames W8 and W9 is $$|-1.2|+|-1.3|+|-1.4|+|-1.5|=5.4$$

in the comparison example, and $$|-0.6|+|-0.8|+|-0.8|+|-1|=3.2$$

in the embodiment. Namely, the interpolation result in the embodiment is closer to the actual value than that in the comparison example. Thus, in the embodiment, even if noise is contained in the raw data, the influence of the noise can be reduced due to the filtering effect.

In the case of the U data, the calculations are the same as those of the V data. Namely, regarding the third pixel for which the raw data is the B-pixel, a mean value of the U data of four pixels adjacent to the third pixel in oblique directions is determined as replacement U data for the third pixel. A mean value of each of the four pixels adjacent in the oblique directions, is obtained using B data of four third pixels adjacent to each of the four pixels in the oblique directions. Further, regarding the second pixel for which the raw data is the G-pixel, a mean value of the U data of four pixels adjacent to the upper, lower, right, and left sides of the second pixel is determined as replacement U data for the second pixel.

According to the embodiment, as described above, even when a subject image has a portion in which different color dots are scattered in a uniform color area, such as a rough wall surface, or even when the raw data contains noise, a false-color is effectively reduced by an interpolation in which the number of calculations are less and that is performed in a short time.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-017782 (filed on Jan. 27, 2003) which is expressly incorporated herein, by reference, in its entirety.

The invention claimed is:

1. A false-color reducing device, comprising:
a raw data reading processor that reads a raw data, in which a first row and a second row are arranged alternately in a vertical direction, said first row being formed by arranging a first pixel representing red (R) data and a second pixel representing green (G) data alternately in a horizontal direction, said second row being formed by arranging said second pixel and a third pixel representing blue (B) data alternately in the horizontal direction;

a first interpolation processor that performs an interpolation on said raw data to generate R plane data in which all the pixels have said R data, G plane data in which all the pixels have said G data, and B plane data in which all the pixels have said B data;

a color difference data calculation processor that calculates U data and V data, which are color difference data, regarding said first, second, and third pixels, using said R plane data, said G plane data, and said B plane data;

a second interpolation processor that calculates a mean value of said V data of four pixels adjacent to said first pixel in oblique directions, and sets the mean value of said V data as replacement V data for said first pixel; and a third interpolation processor that calculates a mean value of said U data of four pixels adjacent to said third pixel in oblique directions, and sets the mean value of said U data as replacement U data for said third pixel.

2. A false-color reducing device according to claim 1, further comprising:

a fourth interpolation processor that calculates mean values of said V data and said U data of four pixels adjacent to the upper, lower, right, and left sides of said second pixel, and sets the mean values of said V data and said U data as replacement V data and U data for said second pixel.

3. A false-color reducing device according to claim 2, wherein said fourth interpolation processor performs an interpolation, using said replacement V data and replacement U data obtained by said second and third interpolation processors.

4. A method of reducing false-color, comprising:

reading raw data in which a first row and a second row are arranged alternately in a vertical direction, the first row being formed by arranging a first pixel representing red (R) data and a second pixel representing green (G) data alternately in a horizontal direction, the second row being formed by arranging the second pixel and a third pixel representing blue (B) data alternately in the horizontal direction;

performing an interpolation on the raw data to generate R plane data in which all the pixels have the R data, G plane data in which all the pixels have the G data, and B plane data in which all the pixels have the B data;

calculating U data and V data, which are color difference data regarding the first, second, and third pixels, using the R plane data, the G plane data, and the B plane data;

calculating a mean value of the V data of four pixels adjacent to the first pixel in oblique directions, and setting the mean value of the V data as replacement V data for the first pixel; and calculating a mean value of the U data of four pixels adjacent to the third pixel in oblique directions, and setting the mean value of the U data as replacement U data for the third pixel.

5. The method of reducing false-color according to claim 4, further comprising:

calculating mean values of the V data and the U data of four pixels adjacent to the upper, lower, right, and left sides of the second pixel, and setting the mean values of the V data and the U data as replacement V data and U data for the second pixel.

6. The method of reducing false-color according to claim 5, wherein the replacement V data and replacement U data are obtained by calculating the mean value of the V data of four pixels adjacent to said first pixel in oblique directions and by calculating the mean value of the U data of four pixels adjacent to said third pixel in oblique directions.

* * * * *